United States Patent
Choo et al.

(10) Patent No.: US 7,649,817 B2
(45) Date of Patent: Jan. 19, 2010

(54) METHOD AND APPARATUS FOR RECORDING AND/OR REPRODUCING DATA

(75) Inventors: Chang-yeob Choo, Suwon-si (KR); Jae-hoon Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 618 days.

(21) Appl. No.: 10/798,270

(22) Filed: Mar. 12, 2004

(65) Prior Publication Data

US 2004/0179443 A1 Sep. 16, 2004

(30) Foreign Application Priority Data

Mar. 14, 2003 (KR) .................... 10-2003-0016115

(51) Int. Cl.
*G11B 7/00* (2006.01)

(52) U.S. Cl. ............... 369/47.44; 369/47.14; 369/53.15

(58) Field of Classification Search ........................ None
See application file for complete search history.

(56) References Cited

U.S. PATENT DOCUMENTS

| | | | | |
|---|---|---|---|---|
| 5,956,307 | A * | 9/1999 | Koudo et al. | 369/47.43 |
| 6,538,967 | B1 * | 3/2003 | Lee | 369/47.46 |
| 7,092,334 | B2 * | 8/2006 | Choi et al. | 369/53.16 |
| 2002/0114243 | A1 * | 8/2002 | Ohta | 369/53.35 |
| 2003/0058762 | A1 * | 3/2003 | Schultz et al. | 369/47.13 |

FOREIGN PATENT DOCUMENTS

| | | | |
|---|---|---|---|
| EP | 1160787 A2 * | 12/2001 | |
| JP | 09-246227 | 8/1997 | |
| JP | 10-201219 | 7/1998 | |
| JP | 11-259870 | 9/1999 | |
| JP | 11-306696 | 11/1999 | |
| JP | 11-353330 | 12/1999 | |
| JP | 2001-084689 | 3/2001 | |
| KR | 10-209075 | 4/1999 | |

OTHER PUBLICATIONS

Korean Office Action of Feb. 28, 2005.

* cited by examiner

*Primary Examiner*—Wayne R Young
*Assistant Examiner*—Adam R Giesy
(74) *Attorney, Agent, or Firm*—Staas & Halsey LLP

(57) ABSTRACT

A method and an apparatus for recording and/or reproducing data in which a recording and/or reproduction velocity is be reduced when a data recording and/or reproduction error occurs due to a defect of an optical disc during recording of data on and/or reproduction of data from the optical disc. The method includes: recording data on an optical disc that is rotating at a predetermined constant angular velocity; determining whether a data recording error occurs; and if it is determined that a data recording error has occurred, recording data on the optical disc that is rotating at a constant angular velocity which is lower than the predetermined constant angular velocity.

30 Claims, 4 Drawing Sheets

METHOD AND APPARATUS FOR RECORDING AND/OR REPRODUCING DATA

CROSS-REFERENCE TO RELATED APPLICATIONS

This application claims the priority of Korean Patent Application No. 2003-16115, filed on Mar. 14, 2003, in the Korean Intellectual Property Office, the disclosure of which is incorporated herein in its entirety by reference.

BACKGROUND OF THE INVENTION

1. Field of the Invention

The present invention relates to a method and an apparatus for recording and/or reproducing data, and more particularly, to a method and an apparatus for recording and/or reproducing data in which a recording and/or reproduction velocity can be reduced when a data recording and/or reproduction error occurs due to a defect of an optical disc during recording of data on and/or reproduction of data from the optical disc.

2. Description of the Related Art

Writable optical discs may deflect light, be eccentric, or be scratched during the manufacturing process. Such deflections, eccentricities, and scratches are referred to as defects. Recording of data on optical discs containing defects may fail or be of poor quality due to the defects. In particular, high-speed data recording on optical disks is greatly affected by the defects.

An algorithm has been developed to reduce the recording velocity so as to prevent recording quality from deteriorating during high-speed recording of data on optical discs due to the defects of the optical discs. The algorithm is used to record data on and/or reproduce data from optical discs.

FIG. 1 is a graph showing a conventional partial constant linear velocity (PCLV) algorithm used to reduce a recording velocity. The conventional PCLV algorithm lowers the rotation velocity of an optical disc to a constant linear velocity (CLV) when a recording error occurs during the recording of data on the optical disc that is rotating at a specific constant angular velocity (CAV).

The conventional PCLV algorithm will be explained in more detail with reference to FIG. 1. In a normal mode, data is recorded at a CAV of 52×. As can be seen in FIG. 1, "A" indicates a case where a recording velocity is lowered prior to reaching 32× due to a recording error. Here, the recording velocity is set to a CLV of 24× to complete recording of data.

"B" indicates a case where a recording error occurs before the recording velocity reaches 40× and the recording velocity is lowered to a CLV of 32× to complete recording of data.

"C" indicates a case where the recording error occurs before the recording velocity reaches 48× and the recording velocity is lowered to a CLV of 40× to complete recording of data.

When the recording error re-occurs in spite of lowering of the recording velocity once, the recording velocity is again lowered to a lower CLV.

FIG. 2 is a graph showing variations in recording velocity and rotations per minute (RPM) when the conventional PCLV algorithm is used. Referring to FIG. 2, the recording velocity is lowered to a CLV of 16× during recording of data at a CAV of 52×. The RPM decreases from 10K to about 3.7K resulting in a difference of about 6.3K.

In the PCLV algorithm, the apparatus may have unstable operations due to sharp variations in the recording velocity and the RPM, or the apparatus may take a long time to record and/or reproduce data. Unstable operation of the apparatus indicates that a problem occurs when a phase lock loop (PLL) is locked, data is overwritten, or recording of data fails due to an unstable servo.

SUMMARY OF THE INVENTION

The present invention provides a method and an apparatus for stably recording data on and/or reproducing data from an optical disc within a shorter recording and/or reproduction time in spite of a defect of the optical disc.

Additional aspects and/or advantages of the invention will be set forth in part in the description which follows and, in part, will be obvious from the description, or may be learned by practice of the invention.

According to an aspect of the present invention, there is a method of recording data, the method comprising: recording data on an optical disc that is rotating at a predetermined constant angular velocity; determining whether a data recording error occurs; if it is determined that the data recording error has occurred, rotating the optical disc at a constant angular velocity which is lower than the predetermined constant angular velocity, and recording data on the optical disc.

According to another aspect of the present invention, there is a method of reproducing data, the method comprising: reproducing data from an optical disc that is rotating at a predetermined constant angular velocity; determining whether a data reproduction error occurs; and if it is determined that the data reproduction error has occurred, rotating the optical disc at a constant angular velocity which is lower than the predetermined constant angular velocity, and reproducing the data from the optical disc.

According to still another aspect of the present invention, there is an apparatus for recording data, the apparatus comprising: a motor driver which controls a motor which rotates an optical disc; an optical pickup which irradiates light onto the optical disc that is rotating to record data, detects the light reflected from the optical disc, and outputs a radio frequency signal corresponding to the reflected light; a radio frequency signal processor which generates and outputs a recording error signal that indicates whether a data recording error occurs in response to the radio frequency signal; and a controller which determines whether the data recording error occurs in response to the recording error signal, and if it is determined that the data recording error has occurred, controls the motor driver to rotate the optical disc at a constant angular velocity which is lower than a predetermined constant angular velocity.

According to yet another aspect of the present invention, there is an apparatus for reproducing data, the apparatus comprising: a motor driver which controls a motor which rotates an optical disc; an optical pickup which irradiates light onto the optical disc that is rotating, detects the light reflected from the optical disc, and outputs a radio frequency signal corresponding to the reflected light; a radio frequency signal processor which generates and outputs a reproduction error signal that indicates whether a data reproduction error occurs, in response to the radio frequency signal; and a controller which determines whether the data reproduction error occurs in response to the reproduction error signal, and if it is determined that the data reproduction error has occurred, controls the motor driver to rotate the optical disc at a constant angular velocity which is lower than a predetermined constant angular velocity.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
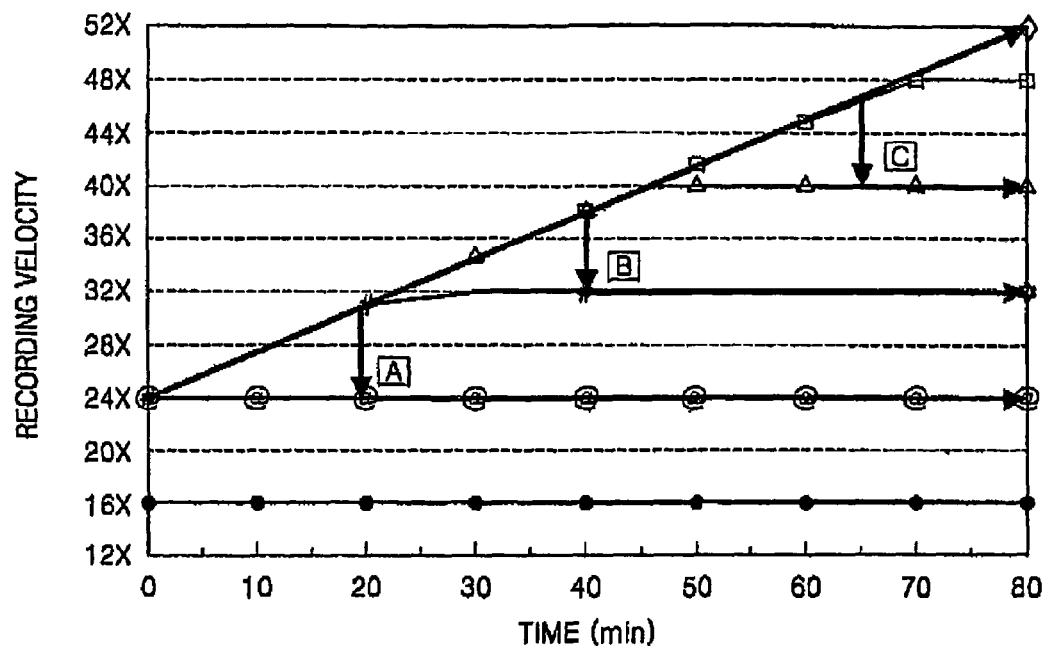
FIG. 1 is a graph for explaining a conventional PCLV algorithm to reduce a recording velocity.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
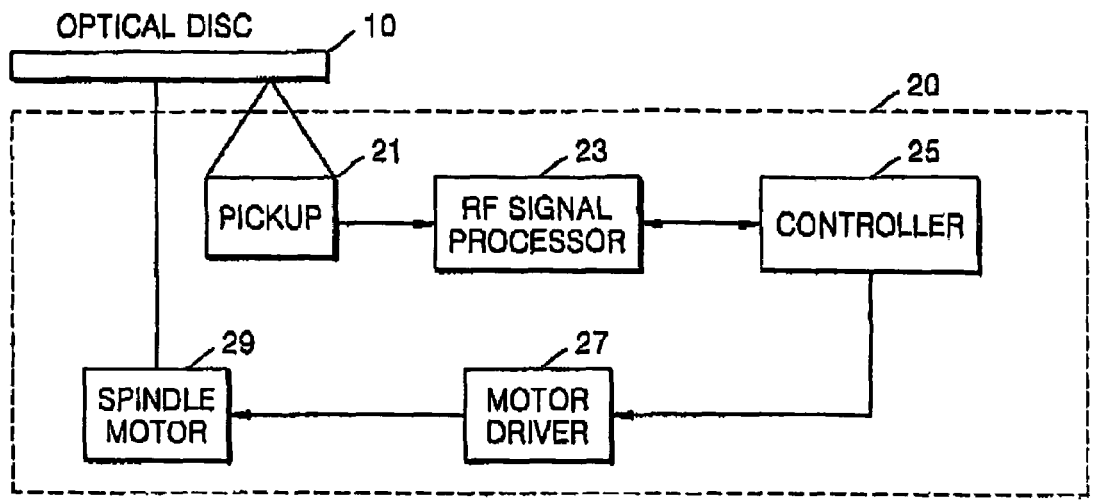
FIG. 3 is a block diagram of an apparatus for recording data on and/or reproducing data from an optical disc according to an embodiment of the present invention.

FIG. 3 is a block diagram of an apparatus for recording data on and/or reproducing data from an optical disc according to an embodiment of the present invention. Referring to FIG. 3, a data recording and/or reproducing apparatus 20 includes an optical pickup 21, a radio frequency (RF) signal processor 23, a controller 25, a motor driver 27, and a spindle motor 29.

In order to record data on and/or reproduce data from an optical disc 10, the optical pickup 21 irradiates a laser beam onto the optical disc 10, detects the laser beam reflected from the optical disc 10, and outputs an RF signal, which is proportional to the laser beam, to the RF signal processor 23.

The RF signal processor 23 receives the RF signal from the optical pickup 21 and outputs various types of signals to determine whether a recording and/or reproduction error occurs, i.e., a focus error signal, a tracking error signal, and an absolute time in pre-groove (ATIP) sync signal, to the controller 25.

The controller 25 receives the various signals from the RF signal processor 23 to determine whether a recording and/or reproduction error occurs, and controls the motor driver 27 to reduce the recording and/or reproduction velocity.

The motor driver 27 receives a control signal from the controller 25 to control the spindle motor 29 so as to reduce the recording and/or reproduction velocity.

A method of recording data on and/or reproducing data from an optical disc using the data recording and/or reproducing apparatus 20 will now be explained.

Figure 4:
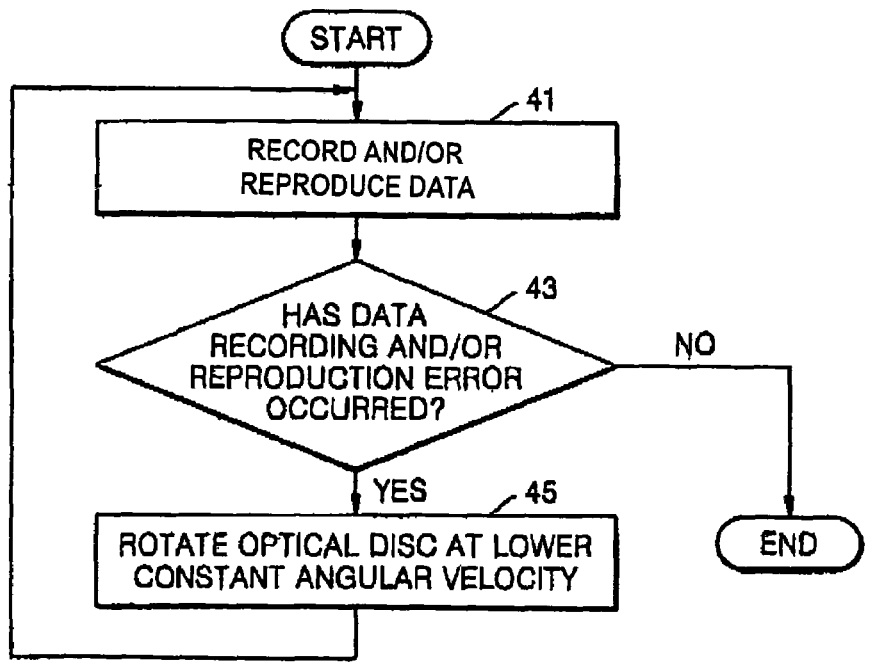
FIG. 4 is a flowchart for explaining a method of recording data on and/or reproducing data from an optical disc according to an embodiment of the present invention.

FIG. 4 is a flowchart for explaining a method of recording data on and/or reproducing data from an optical disc according to an embodiment of the present invention. Referring to FIG. 4, when the optical disc 10 is loaded into the data recording and/or reproducing apparatus 20, the data recording and/or reproducing apparatus 20 is initialized to read basic data from a lead—in area of the optical disc 10. Examples of this basic data are information on the structure of the optical disc 10, a recording and/or reproduction light power, and a recording and/or reproduction velocity. Thereafter, in operation 41, the optical pickup 21 of the data recording and/or reproducing apparatus 20 irradiates light onto the optical disc 10 according to a command to record data on and/or reproduce data from the optical disc 10 at a predetermined CAV.

In operation 43, the controller 25 receives the focus error signal, the tracking error signal, and the ATIP sync signal from the RF signal processor 23 to determine whether a data recording and/or reproduction error occurs during the recording and/or reproduction of data.

When a value of the focus error signal or the tracking error signal exceeds a predetermined range, or errors occur in at least a predetermined number or more of ATIP sync signals to be periodically input, the controller 25 determines that a data recoding and/or reproduction error has occurred.

If it is determined that a data recording and/or reproduction error has occurred, in operation 45, the controller 25 lowers the rotational velocity of the optical disc 10 to a CAV lower than the predetermined CAV.

Figure 5:
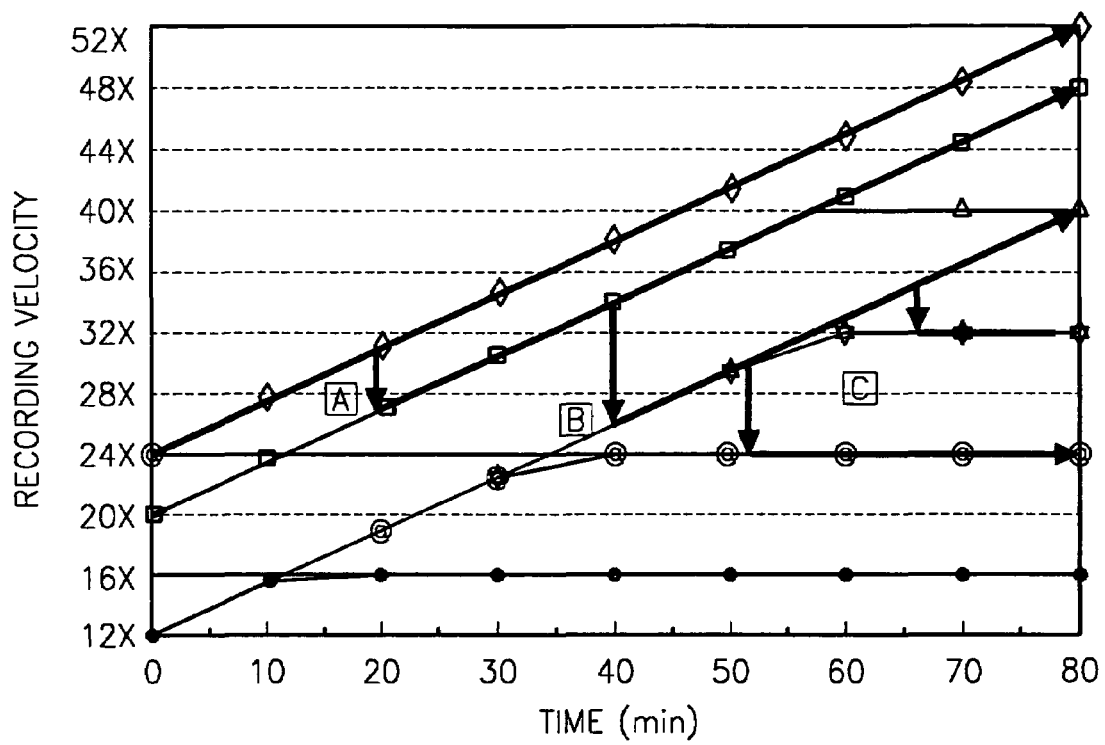
FIG. 5 is a graph for explaining an algorithm for reducing a recording and/or reproduction velocity according to an embodiment of the present invention.

FIG. 5 is a graph for explaining an algorithm for reducing a recording and/or reproduction velocity according to an embodiment of the present invention. Referring to FIG. 5, the algorithm is used to record data and/or reproduce data at a lower CAV when a recording and/or reproduction error occurs during recording of data and/or reproduction of data at a CAV of 52×.

Referring to FIG. 5, "A" indicates a case where a recording and/or reproduction velocity is lowered to a CAV of 48× when a recording and/or reproduction error occurs during recording of data and/or reproduction of data at a CAV of 52×.

Referring to FIG. 5, "B" indicates a case where the recording and/or reproduction velocity is lowered to a CAV of 40× when the recording and/or reproduction error occurs during recording of data and/or reproduction of data at a CAV of 48×.

Referring to FIG. 5, "C" indicates a case where the recording and/or reproduction velocity is lowered to a CLV of 24× or 32× when the recording and/or reproduction error occurs during recording of data and/or reproduction of data at the CAV of 40×. There is not a great difference in the recording and/or reproduction velocity when a low CAV is lowered to a lower CAV or CLV. In the case of "C", the recording velocity is lowered to a low CLV.

In the cases of "A" and "B", when a recording and/or reproduction error occurs during recording and/or reproduction of data, the recording velocity is lowered to a CAV one step lower than the current CAV.

However, the recording and/or reproduction velocity may be lowered to a CAV two—steps lower than the current CAV according to the extent of the recording and/or reproduction error. For example, the controller 25 may divide the value of the focus error signal or the tracking error signal into a plurality of ranges and determine in which of the ranges the recording and/or reproduction error belongs, i.e., determine to what extent the recording and/or reproduction velocity is to be lowered according to the magnitude of the value of the focus error signal or the tracking error signal.

Referring again to FIG. 4, after the recording and/or reproduction velocity is reduced in operation 45, the process returns to operation 41 to repeat operations 41, 43, and 45.

Figure 6A:
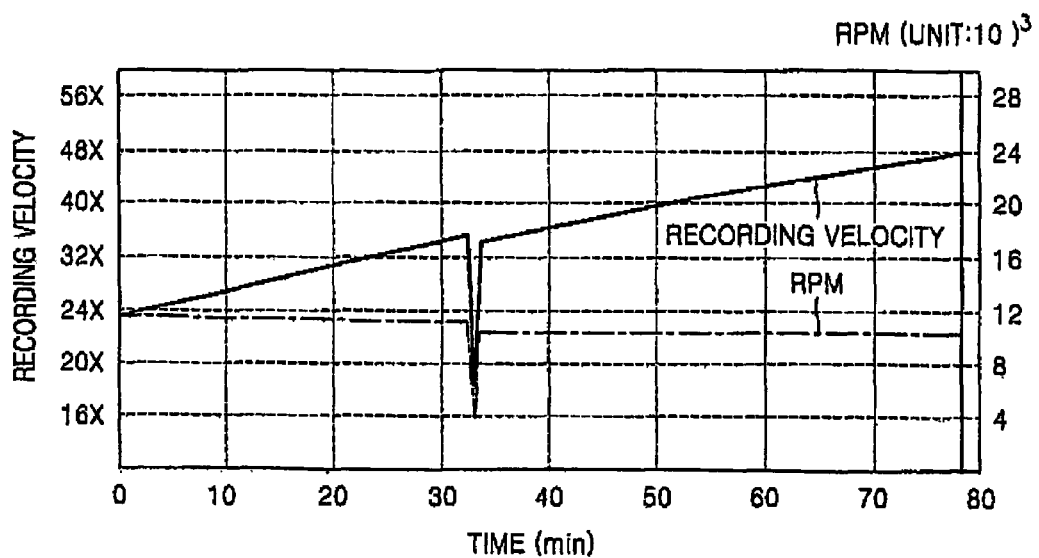
FIGS. 6A and 6B are graphs showing variations in a recording and/or reproduction velocity and an RPM when the algorithm of FIG. 5 is used according to an embodiment of the present invention.
Figure 6B:
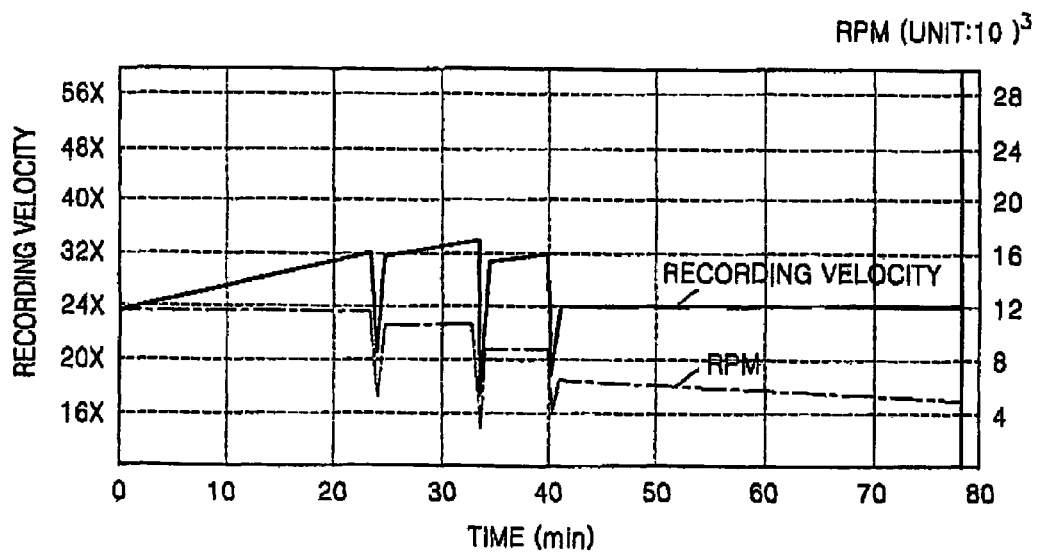

FIGS. 6A and 6B are graphs showing variations in recording and/or reproducing velocity and RPM when the algorithm of FIG. 5 is used according to an embodiment of the present invention. As can be seen in FIG. 6A, the recording and/reproduction velocity is lowered to a CAV of 48× during recording and/or reproduction of data at a CAV of 52×, and the RPM decreases from 11K to about 10K. While it has been described that the RPM is reduced by about 6.3K when the conventional PCLV algorithm is used, a difference in the RPM is about 1K when the algorithm of the present invention is used.

Figure 2:
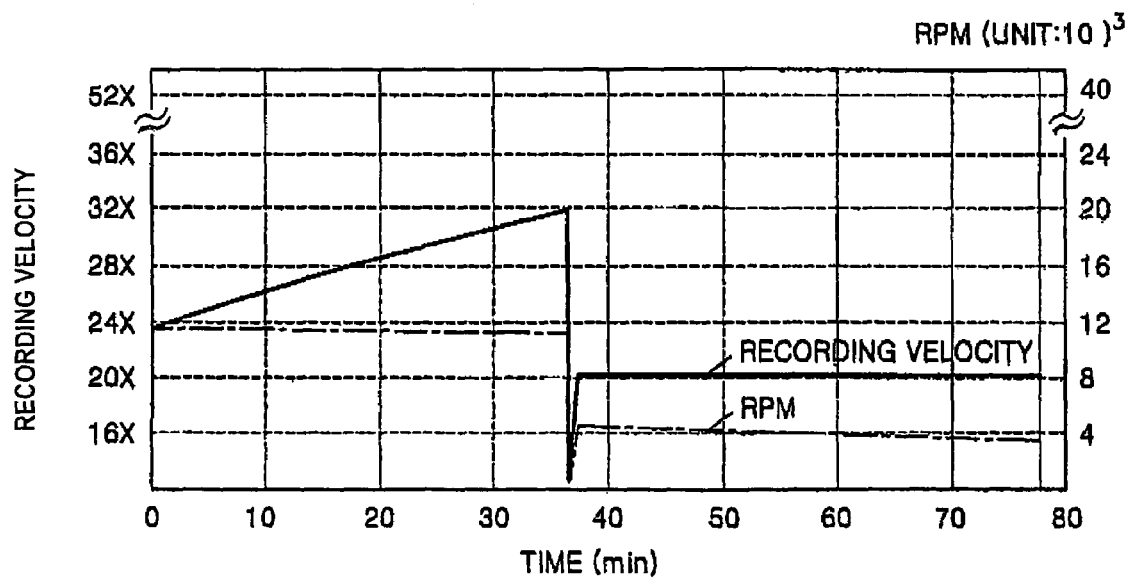
FIG. 2 is a graph showing variations in recording velocity and RPM when the conventional PCLV algorithm is used.

As can be seen in FIG. 6B, the recording and/or reproduction velocity is consecutively lowered due to a defect of an optical disc. In other words, the recording and/or reproduction velocity is consecutively lowered from a CAV of 52× to a CAV of 48×, a CAV of 40×, and a CLV 24×. In the present embodiment, the RPM is slightly reduced in proportion to the recording and/or reproduction velocity, compared to the RPM according to the conventional PCLV algorithm of FIG. 2.

As described above, in a method and an apparatus for recording and/or reproducing data, according to the present invention, data can be stably recorded on and/or reproduced from an optical disc within a shorter recording and/or reproduction time in spite of a defect of the optical disc. A recording and/or reproduction velocity can be lowered to a CAV. Since an RPM proportional to the recording and/or reproduction velocity is not sharply reduced compared to an RPM according to the related art, the apparatus can stably operate. Also, although the recording and/or reproduction velocity is lowered, an algorithm for reducing a recording and/or reproduction velocity according to the present invention can allow an average recording and/or reproduction velocity to increases compared to a conventional PCLV algorithm. Thus, the recording and/or reproduction time can be reduced.

To compare the algorithm of present invention with the conventional PCLV algorithm, the recording and/or reproduction time was measured under the conditions that the recording and/or reproduction velocity is a CAV of 52× and 650M data corresponding to 80-minute reproduction capacity is recorded. In the case of the conventional PCLV algorithm, the recording and/reproduction time took 3 minutes and 47 seconds. In the case of the algorithm of the present invention, the recording and/or reproduction time took 3 minutes and 8 seconds. As a result, the recording and/reproduction time according to the algorithm of the present invention was reduced by 39 seconds compared to the conventional PCLV algorithm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data, the method comprising:
   recording the data on an optical disc that is rotating at a predetermined constant angular velocity;
   determining whether a data recording error occurs due to a defect of the optical disc; and
   if it is determined that the data recording error has occurred, rotating the optical disc at an adjusted constant angular velocity which is lower than the predetermined constant angular velocity, and recording the data on the optical disc that is rotating at the adjusted constant angular velocity,
   wherein the adjusted constant angular velocity is one step or two steps lower than the predetermined constant angular velocity, according to an extent of the data recording error.

2. The method of claim 1, further comprising:
   determining whether the data recording error occurs while the optical disc is rotated at the adjusted constant angular velocity, and if the data recording error is determined to exist, rotating the optical disk at a constant angular velocity that is lower than the adjusted constant angular velocity, and recording the data on the optical disc.

3. The method of claim 2, further comprising repeatedly determining whether the data recording error occurs while the optical disk is rotating.

4. The method of claim 3, further comprising rotating the optical disc at a lower constant angular velocity whenever the data recording error is detected.

5. The method of claim 2, further comprising:
   determining whether the data recording error occurs while the optical disc is rotated at the constant angular velocity that is lower than the adjusted constant angular velocity, and if the data recording error is determined to exist, rotating the optical disk at a constant linear velocity that is lower than the constant angular velocity that is lower than the adjusted constant angular velocity, and recording the data on the optical disc.

6. The method of claim 1, wherein the determining whether the data recoding error occurs due to the defect of the optical disc is accomplished using at least one of a focus error signal, a tracking error signal, and an ATIP sync signal.

7. A method of reproducing data, the method comprising:
   reproducing the data from an optical disc that is rotating at a predetermined constant angular velocity;
   determining whether a data reproduction error occurs due to a defect of the optical disc; and
   if it is determined that the data reproduction error has occurred, rotating the optical disc at an adjusted constant angular velocity which is lower than the predetermined constant angular velocity, and reproducing the data from the optical disc,
   wherein the adjusted constant angular velocity is one step or two steps lower than the predetermined constant angular velocity, according to an extent of the data recording error.

8. The method of claim 7, further comprising:
   determining whether a data reproduction error occurs while the optical disc is rotated at the adjusted constant angular velocity, and if the data reproduction error is determined to exist, rotating the optical disc at a constant angular velocity which is lower than the adjusted angular velocity, and reproducing the data from the optical disc.

9. The method of claim 8, further comprising:
   determining whether the data reproduction error occurs while the optical disc is rotated at the constant angular velocity that is lower than the adjusted constant angular velocity, and if the data recording error is determined to exist, rotating the optical disk at a constant linear velocity that is lower than the constant angular velocity that is lower than the adjusted constant angular velocity, and recording the data on the optical disc.

10. The method of claim 7, further comprising repeatedly determining whether the data reproduction error occurs while the optical disk is rotating.

11. The method of claim 10, further comprising rotating the optical disc at a lower constant angular velocity whenever the data reproduction error is detected.

12. The method of claim 7, further comprising using at least one of a focus error signal, a tracking error signal, and an ATIP sync signal to determine whether the data reproduction error occurs due to a defect of the optical disc.

13. An apparatus for recording data, the apparatus comprising:
    a motor driver which controls a motor which rotates an optical disc at a constant angular velocity;

an optical pickup which irradiates light onto the optical disc, detects the light reflected from the optical disc, and outputs a radio frequency signal corresponding to the reflected light;

a radio frequency signal processor which, in response to the radio frequency signal, generates and outputs a recording error signal that indicates whether a data recording error occurs; and a controller which, in response to the recording error signal, determines whether the data recording error occurs, and if it is determined that the data recording error has occurred, controls the motor driver to rotate the optical disc at an adjusted constant angular velocity which is lower than a predetermined constant angular velocity, wherein the adjusted constant angular velocity is one step or two steps lower than the predetermined constant angular velocity, according to an extent of the data recording error, and wherein the controller determines whether the data recording error occurs due to a defect of the optical disc.

14. The apparatus of claim 13, wherein the controller controls the motor driver to lower the constant angular velocity at which the optical disk is rotated until the data recording error does not occur.

15. The apparatus of claim 14, wherein if it is determined that the data recording error has occurred, the controller controls the motor driver to rotate the optical disc at the adjusted constant angular velocity which is one step lower than the predetermined constant angular velocity.

16. The apparatus of claim 14, wherein if it is determined that the data recording error has occurred when the constant angular velocity is two steps lower than the predetermined constant angular velocity, the controller controls the motor driver to rotate the optical disc at a constant linear velocity that is lower than the two steps lower constant angular velocity.

17. The apparatus of claim 13, wherein the controller determines whether the data recording error occurs due to the defect of the optical disc using at least one of a focus error signal, a tracking error signal, and an ATIP sync signal which are output from the radio frequency signal processor.

18. The apparatus of claim 17, wherein the controller determines the data recording error occurs when a value of the focus error signal or the tracking error signal exceeds a predetermined range, or errors occur in at least a predetermined number of ATIP sync signals to be periodically input.

19. The apparatus of claim 17, wherein the controller divides the value of the focus error signal or the tracking error signal into a plurality of ranges, determines in which of the ranges the recording error belongs, and determines to what extent the constant angular velocity is to be lowered according to the magnitude of the value of the focus error signal or the tracking error signal.

20. An apparatus for reproducing data, the apparatus comprising:

a motor driver which controls a motor which rotates an optical disc at a constant angular velocity;

an optical pickup which irradiates light onto the optical disc, detects the light reflected from the optical disc, and outputs a radio frequency signal corresponding to the reflected light;

a radio frequency signal processor which, in response to the radio frequency signal, generates and outputs a reproduction error signal that indicates whether a data reproduction error occurs; and a controller which, in response to the reproduction error signal, determines whether the data reproduction error occurs, and if it is determined that the data reproduction error has occurred, controls the motor driver to rotate the optical disc at an adjusted constant angular velocity which is lower than a predetermined constant angular velocity, wherein the adjusted constant angular velocity is one step or two steps lower than the predetermined constant angular velocity, according to an extent of the data recording error, and wherein the controller determines whether the data recording error occurs due to a defect of the optical disc.

21. The apparatus of claim 20, wherein the controller controls the motor driver to lower the constant angular velocity at which the optical disc is rotated until the data reproduction error does not occur.

22. The apparatus of claim 21, wherein if it is determined that the data reproduction error has occurred, the controller controls the motor driver to rotate the optical disc at the adjusted constant angular velocity which is one step lower than the predetermined constant angular velocity.

23. The apparatus of claim 21, wherein the controller determines whether the data reproduction error occurs due to the defect of the optical disc using at least one of a focus error signal, a tracking error signal, and an ATIP sync signal which are output from the radio frequency signal processor.

24. The apparatus of claim 23, wherein the controller determines the data recording error occurs when a value of the focus error signal or the tracking error signal exceeds a predetermined range, or errors occur in at least a predetermined number or more of ATIP sync signals to be periodically input.

25. The apparatus of claim 23, wherein the controller divides the value of the focus error signal or the tracking error signal into a plurality of ranges, determines in which of the ranges the recording error belongs, and determines to what extent the constant angular velocity is to be lowered according to the magnitude of the value of the focus error signal or the tracking error signal.

26. The apparatus of claim 21, wherein if it is determined that the data reproduction error has occurred when the constant angular velocity is two steps lower than the predetermined constant angular velocity, the controller controls the motor driver to rotate the optical disc at a constant linear velocity that is lower than the two steps lower constant angular velocity.

27. A method of recording and/or reproducing data, the method comprising:

at least one of:
  recording the data on an optical disc that is rotating at a predetermined constant angular velocity, and
  reproducing the data from an optical disc that is rotating at a predetermined constant angular velocity;
determining whether at least one of a data recording error or a data reproduction error occurs due to a defect of the optical disc;
if it is determined that the data recording error has occurred, rotating the optical disc at an adjusted constant angular velocity which is lower than the predetermined constant angular velocity, and recording the data on the optical disc that is rotating at the adjusted constant angular velocity; and
if it is determined that the data reproduction error has occurred, rotating the optical disc at an adjusted constant angular velocity which is lower than the predetermined constant angular velocity, and reproducing the data from the optical disc that is rotating at the adjusted constant angular velocity, wherein the adjusted constant angular velocity is one step or two steps lower than the predetermined constant angular velocity, according to an extent of the data recording error.

28. The method of claim 27, further comprising:

determining whether at least one of the data recording error or the data reproduction error occurs while the optical disc is rotated at the adjusted constant angular velocity;

if the data recording error is determined to exist, rotating the optical disk at a constant angular velocity that is lower than the adjusted constant angular velocity, and recording the data on the optical disc; and if the data reproducing error is determined to exist, rotating the optical disk at a constant angular velocity that is lower than the adjusted constant angular velocity, and reproducing the data from the optical disc.

29. The method of claim 28, further comprising repeatedly determining whether at least one of the data recording error or the data reproducing error occurs while the optical disk is rotating.

30. The method of claim 29, further comprising rotating the optical disc at a lower constant angular velocity whenever at least one of the data recording error or the data reproducing error is detected.

* * * * *